Dec. 31, 1957  J. A. NORTHCOTE ET AL  2,818,269
ADJUSTABLE WHEEL ASSEMBLY FOR FARM IMPLEMENT
Filed Oct. 3, 1955  4 Sheets-Sheet 1

INVENTORS
J.A. NORTHCOTE &
D.W. DIXON
BY
ATTORNEYS

Dec. 31, 1957   J. A. NORTHCOTE ET AL   2,818,269
ADJUSTABLE WHEEL ASSEMBLY FOR FARM IMPLEMENT
Filed Oct. 3, 1955   4 Sheets-Sheet 2

*INVENTORS*
J. A. NORTHCOTE &
D. W. DIXON

ATTORNEYS

INVENTORS
J. A. NORTHCOTE &
D. W. DIXON

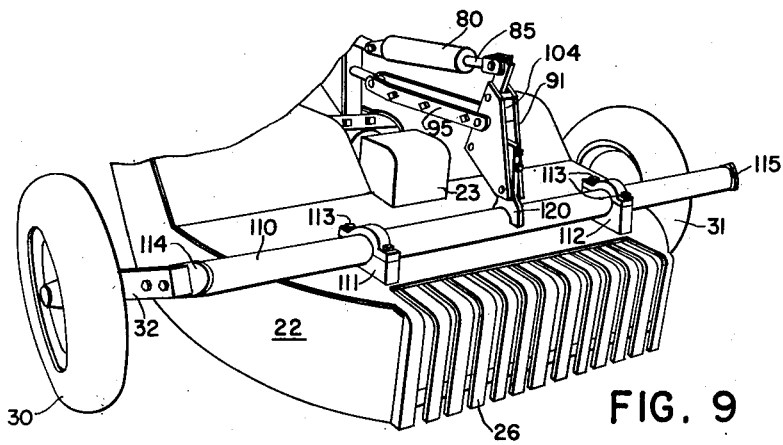

United States Patent Office 2,818,269
Patented Dec. 31, 1957

2,818,269

ADJUSTABLE WHEEL ASSEMBLY FOR FARM IMPLEMENT

John A. Northcote and David W. Dixon, Welland, Ontario, Canada, assignors to John Deere Plow Company (Limited), Welland, Ontario, Canada, a corporation of Canada Application October 3, 1955, Serial No. 538,158

17 Claims. (Cl. 280—44)

This invention relates to a farm implement of the type adapted to be drawn over a field of earth-borne plants by a draft vehicle having implement connecting means and which is operative to treat the plants in a swath of predetermined width parallel to the direction of travel. More particularly this invention relates to a wheel assembly supporting the implement and which is operative to raise or lower the implement.

An implement of the type described is a rotary type cutter which normally operates to cut, shred and reduce plants, crop residue, and other matter passing under it. The shredding or reducing mechanism comprises basically a rotary driven knife blade or blades mounted to rotate about a vertical axis and which treats the crops or plants at a predetermined height relative to the ground. The reducing mechanism is normally cased in a sturdy steel housing or casing which prevents materials or debris from flying unrestrictably and outwardly and which is formed to aid in thorough shredding or reducing of the materials. Normally, the rearward portion of the housing is provided with a grate which is yieldable to permit objects moving with considerable force to be driven rearwardly and outwardly of the housing. In providing a wheel assembly for such an implement, it is desirous to place the wheels forwardly of the rearward portion of the housing in order to protect the tires and other parts of the wheels against flying debris driven through that portion.

An implement of this type can and usually is operated in a plurality of fields such as in orchards, cotton fields, corn fields, pastures and other fields which have obstructions such as trees or/and which are bordered by fences, swells, ridges, or other such types. There exists considerable advantage therefore in providing a wheel assembly which is adaptable to have the wheels adjusted inwardly of the swath thereby permitting the housing or casing to pass adjacent to the trees, fences, borders, and ridges bordering the field in order that follow-up manual labor may be reduced to a minimum. It is, therefore, a purpose of this invention to provide a wheel assembly which is adjustable to permit the wheels to normally extend laterally outwardly of the housing of the implement for maximum protection from the flying debris temporarily to be moved to the rearward of the implement and inwardly of the swath to permit closer operation around trees, borders, and other obstructions.

It is also a purpose of this invention to incorporate with the wheel assembly a hydraulic cylinder to serve as power transmitting means for adjusting the wheels to raise or lower the implement. In the proposed assembly the wheels will operate to raise or lower the implement in response to movement of a rockable member which is connected to the hydraulic cylinder by a simple linkage which has suitable adjustments therein to cause the implement to be raised upon the extension stroke of the cylinder, and to be lowered in the retracting stroke, regardless of whether the wheels are in their rearward or forward position.

It is also a purpose of this invention to provide a hitch device connecting the implement to the tractor which is adjustable to raise or lower its forward end.

Other purposes and objects of the invention will become apparent to one skilled in the art upon obtaining a full understanding of the present invention as set forth in the following description and shown in the accompanying drawings.

Fig. 9 is a rear perspective view of a rear portion of an implement of the type described incorporating a modification of the present invention.

Fig. 10 is an enlarged side view of the linkage of the modification and showing the disposition of the various links and connections when the wheels are in the rearward position.

Fig. 11 is a view similar to Fig. 10 and showing the disposition of the links and connections when the wheels are in the forward position.

Fig. 12 is a rear view of the linkage as shown in Fig. 10.

Fig. 13 is a sectional view taken along the line 13—13 of Fig. 12.

Figure 1:
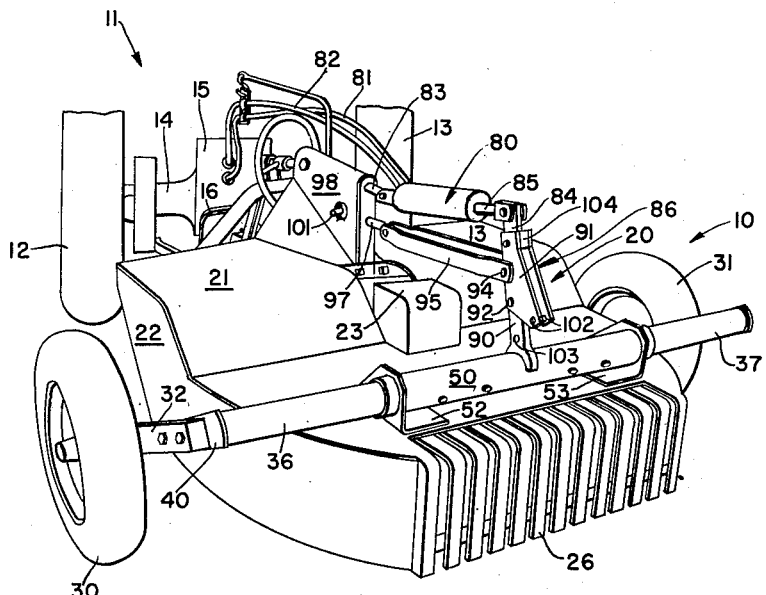
Fig. 1 is a rear and left perspective view of an implement of the type described incorporating the present invention and a portion of a tractor.
Figure 8:
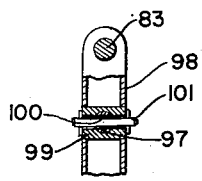
Fig. 8 is a sectional view taken along line 8—8 of Fig. 2.

The implement or rotary cutter, indicated in its entirety by the reference numeral 10, is connected to the rear of a tractor 11 having left and right wheels 12, 13, respectively, supporting a transverse rear axle 14. The tractor is of a usual commercial design having therein a conventional hydraulic power control system mounted within the housing 15. Also provided is the usual type of power take-off shaft mounted under a safety shield 16.

The implement 10 is made up of a housing or casing 20 which includes a laterally extending portion 21 positioned above the reducing mechanism of the rotary cutter and depending portions 22 which extend along the sides of the implement. The operating or reducing mechanism within the casing, while not shown, is of the usual type comprising laterally extending knives or flails mounted on a centrally positioned rotor shaft driven at a relatively high speed through a gear type transmission located within a transmission housing 23. The transmission is driven from the power take-off shaft on the tractor through a drive shaft 24 and suitable articulate connections, not shown, which connect with the power take-off shaft. Protective shielding 25 is mounted above the drive shaft 24. The rear portion of the housing is composed of laterally spaced grille members 26 individually mounted to yield upwardly thereby permitting stones or other solid objects to pass through and to be driven rearwardly of the implement.

The wheel assembly comprises basically the left and right wheel members 30, 31 mounted respectively on longitudinally extending and transversely spaced apart arms 32 and 33 by means of short stub axles 34 and 35 which extend through the respective wheels 30 and 31 and are fixed to an end of the respective arms 32 and 33. In the form of the invention shown in Figs. 1–8, the opposite ends of the arms 32 and 33 are fixed to a pair of transverse shafts 36 and 37 by bolt and nut combinations 38 extending through the arms and suitable supporting brackets 40 and 41 which are fixed to the ends of the shafts 36 and 37. A rockable member or transverse rockshaft 50 is journaled to the laterally extending plate portion 21 of the housing 20 on transversely spaced apart supporting brackets 52 and 53 having lateral portions fixed to the lateral surface 21 of the casing 20. The rockable member 50 is mounted at the rear of the implement directly forward of the grille 26. The shaft 50 is of tubular construction and receives the ends of the transverse shafts 36 and 37.

Figures 6, 7:
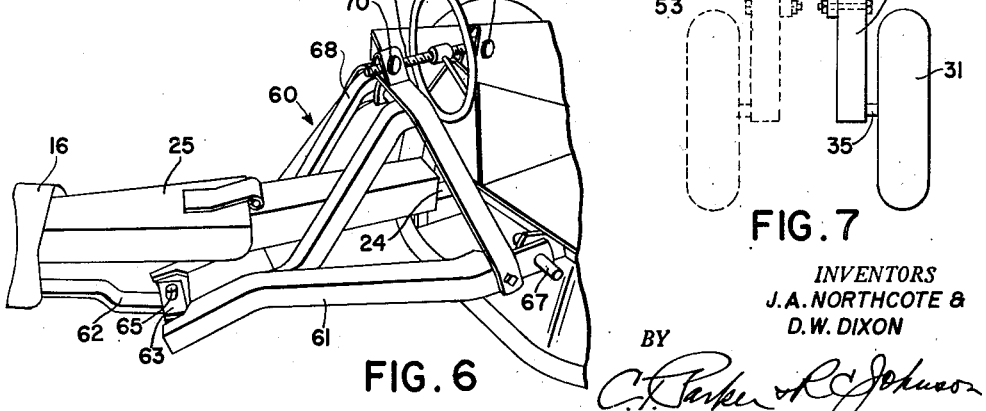
Fig. 6 is a side perspective of the hitch device connecting the implement to the tractor.
Fig. 7 is a plan view of the right wheel and axle assembly.
Figure 4:
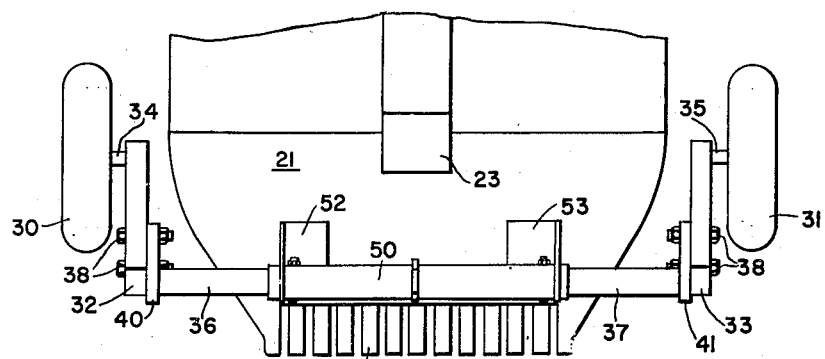
Fig. 4 is a plan view of the rear portion of the implement showing the wheels in a forward position.
Figure 5:
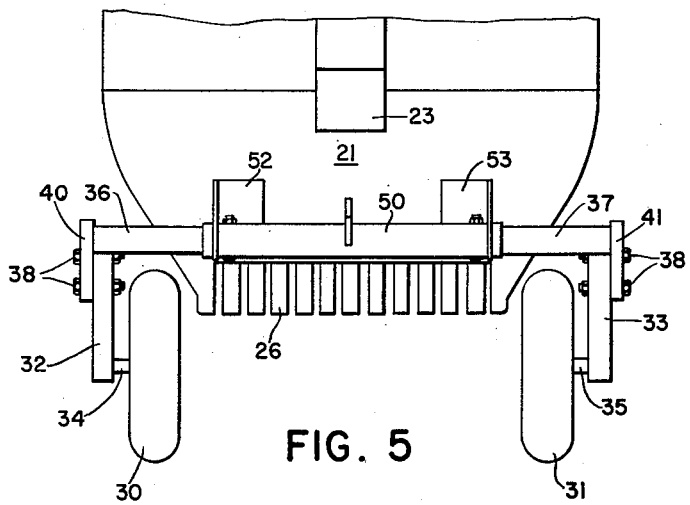
Fig. 5 is a plan view similar to Fig. 4 showing the wheels in a rearward position.

Tread adjustment is provided in the wheel assembly in the first instance by reversing the positions of the arms 32 and 33 relative to their respective brackets 40 and 41, as indicated in Figs. 4, 5, and 7, by removing the bolt and nut combinations 38 connecting the arms and brackets, and moving the arms 32, 33 to the opposite side of the brackets 40, 41 and replacing the bolt and nut combination 38 to fix the arms in that position. In this manner the stub axles 34, 35 may be adjusted to extend inwardly or outwardly of the arms 32, 33. Tread adjustment may be obtained in a second instance by telescoping the transverse shafts 36, 37, again looking at Fig. 7, inwardly or outwardly in the tubular shaft 50. The shaft 50 is provided with suitable apertures 54 which are registerable with complementary apertures 55 in the shafts 36, 37 through which suitable pins or locking members 56 may extend to lock the transverse shafts 36, 37 against axial and angular movement relative to the rockshaft 50.

The wheels 30 and 31 may be adjusted to be positioned forwardly or rearwardly of the rockshaft 50 by placing the apertures 55 angularly around the transverse shafts 36 and 37 to permit the arms 32, 33 to extend at a plurality of angular positions relative to the shaft 50. Also, the arms 32, 33 may be reversed in their direction of extension by removing the transverse shafts 36 and 37 from the rockable member 50 and reversing the location of the wheels 30 and 31 to the opposite sides of the implement. In this manner the lock pins 56 will lock the shafts 36 and 37 in a position whereby the arms 32 and 33 will extend oppositely to that which existed prior to reversing the position of the wheels. In this latter method no angular dispositions of apertures 55 would be necessary.

The housing or casing 20 has a narrow rear portion (Figs. 4, 5) substantially narrower than the swath of materials cut and reduced by the reducing mechanism, which affords positions in which the supporting wheels may be moved laterally inwardly of the edges of the swath. It is apparent, however, that in moving the wheels 30 and 31 in a position to the rear of the implement, as in Fig. 5, they are placed in a position where stones, debris, and other foreign articles and matter discharging through the grille 26 may strike them. Therefore, while the narrower position of the wheels is preferable while operating next to fences, borders, trees, and other such types of obstructions, it is preferable in order to protect the wheels, to move the wheels to their forward position when operating in more open terrain.

At the forward end of the implement 10 is a hitch device indicated in its entirety by the reference numeral 60. The hitch device comprises a fore-and-aft extending rigid frame 61 connecting at its forward end to a tractor drawbar 62 for limited vertical movement by means of two laterally extending and vertically spaced apart bars 63 and 64 which receive the rear end of the drawbar 62 between them and a drop pin 65 which extends through the bars 63, 64 and the drawbar 62. The frame 61 is substantially A-shaped having diverging leg portions pivotally connected for vertical movement at their rear ends to transversely spaced pins 66, 67 on the forward end of the implement. The hitch device 60 also includes a vertically disposed structural portion 68 affixed at its lower ends to the frame 61. The upper end of the upright portion 68 is pivotally connected to the forward end of the housing 20 by a threaded member 69 which extends through suitable trunnion means 70 and 71 mounted respectively on the structural portion 68 and the forward portion of the housing. A turn wheel 72 is mounted on the threaded member 69 and operates to turn the member to increase or decrease the distance between the forward end of the implement and the upright portion 68 of the hitch device. The hitch device operates not only as the media for connecting the implement to the implement connecting means, but also to adjust the forward end of the implement vertically through regulating the distance between the upright portion 68 and the forward end.

Also provided on the implement is a hydraulic cylinder 80 operated from the hydraulic power source on the tractor through hydraulic hoses 81 and 82. The hydraulic cylinder 80 is connected at its forward end to a rigidly connected and rearwardly projecting shaft 83 and has its hydraulic ram 85 connected at its rearward end to an upright link or lever 84 which is a part of a linkage 86 extending from the rockable shaft 50.

The linkage 86 includes a rocker arm 90 fixed to the rockable member 50 and extending upwardly therefrom. A lever 91 is pivotally connected to the upper end of the rocker arm as indicated at 92. The link 84 is rigidly connected to the lever 91 by vertically spaced apart pins 93 and 94 which extend through both the lever and the link 84. The casing 20 is further connected to a mid-portion of the lever 91 by means of a fore-and-aft extending arm 95 which is connected at its rear end to a mid-portion of the lever 91 and at its forward end to a fore-and-aft extending rod 97 which extends forwardly and into suitable supporting structure 98 projecting upwardly from the housing 20, and through a guide 99 supported by the supporting structure 98. The rod 97 is apertured as at 100 (Fig. 8) to permit a pin 101 to extend through the rod and the supporting structure 98 to prevent fore-and-aft movement of the rod 97. Also provided on the lever 91 is an aperture 102 which is registrable with an aperture 103 on the lower portion of the rocker arm 90. The pins 93, 101 may optionally be removed or inserted into the apertures 102, 103 depending upon the effect desired. Provided between the plates which make up the lever 91 is a stop 104 the purpose of which will presently be explained.

Figure 2:
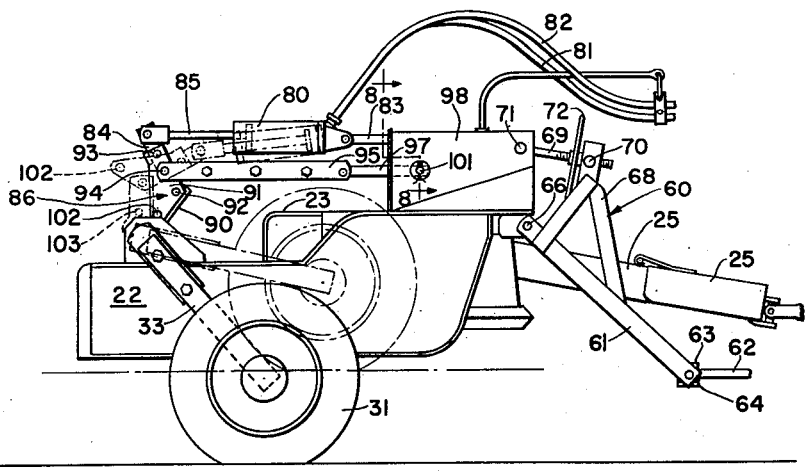
Fig. 2 is a side view of the implement showing the wheels in their forward position.

The operation of the cylinder 80 to raise or lower the implement will first be discussed when the wheels are in their forwardly extended position as shown in Fig. 2. There is no connection between the apertures 102 and 103 and, therefore, the lever 91 is free to rotate relative to the rocker arm 90 about the connection 92. To raise the implement from working or operating position, as shown in dotted representation, to transport position the hydraulic cylinder 80 is operated to move the ram 85 rearwardly. The link 95 being rigidly held by the pin 101 against movement will cause the lever 91 to pivot about its mid-portion causing the upper end of the rocker arm 90 to move to the rear. This action will cause the wheel 30 and 31 to move downwardly relative to the implement which will in effect raise the implement off the ground. If upon reaching the transport position it is desired to release the load from the hydraulic cylinder the pin 93 may be removed, inasmuch as the link 84 will then be held against the stop 104, and inserted through the apertures 102, 103 which will at that time be aligned with one another. The implement may therefore be locked in its transport position either for storage or for other purposes in which it is desired to remove the hydraulic cylinder 85.

Figure 3:
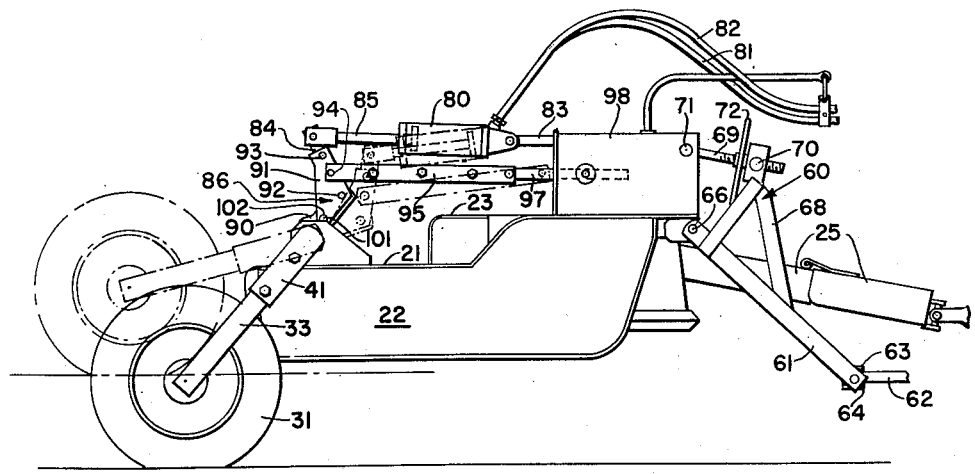
Fig. 3 is a view similar to Fig. 2 showing the wheels in their rearward position.

The operation of the hydraulic cylinder 80 to raise or lower the implement when the wheels are in their rearwardly extended position will now be discussed with reference specifically to Fig. 3. In this arrangement the pin 101 is removed from the connection between the rod 97 and the guide 99 and replaced to extend through the apertures 102 and 103 thereby locking the lever 91 against pivotal movement relative to the rocker arm 90. The rod 97 is free to reciprocate forwardly and rearwardly thereby offering no resistance to the lever 91 in its forward or rearward movement. The pin 93 is extended through the link 84 and the lever 91. The link 84, lever 91, and rocker arm 90 are, therefore, all rigidly held together. Therefore, upon extension of the ram 85 the wheels will move from the operative or working position as shown in dotted representation, to the raised or transport position. Obviously, upon retraction of the ram 85 the wheels will move to the operative position. When the ram 85 is extended the link 84 will be in a position to rest against the stop 104 thereby permitting the pin 93 to be removed. If it is desired to lock the implement in its transport position the pin 93 may be inserted through the guide 99 and aperture 100 of the rod 97, which will then be in alignment, thereby locking the rod 97 and arm 95 against movement. Thus, regardless of whether the wheels are in their forward or rearward position the implement will be raised on the extending stroke of the ram, and will be lowered on the retracting stroke.

In the modification of the invention shown in Figs. 9–12, the wheel assembly includes a single rigid rockable member 110 extending transversely relative to the implement and having opposite ends extending outwardly of the depending sides 22. The rockable member 110 is transversely journaled on the implement by a pair of transversely spaced split bearing assemblies 111 and 112 fixed to the lateral surface 21 of the housing 20. Connected to opposite ends of the rockable member 110 are wheel means comprising left and right hand wheels 30 and 31, stub axles 34, 35, and fore-and-aft extending arms 32, 33 mounted on fore-and-aft extending brackets 114, 115, which are fixed to opposite ends of the rockable member 110, in a manner similar to that previously described in reference to Figs. 1–9. In the modification, wheel tread adjustment is limited only to that created by reversing the arms 33 and 34 on the brackets 114, 115 to cause the stub axles 34 and 35 to project inwardly or outwardly relative to their respective arms. Adjustment may be made to cause the wheel arms 32 and 33 to project forwardly of or rearwardly of the rockable member 110 by removing bolts 113 which are part of the split bearing assemblies 111 and 112 to permit the rockable member 110 to be lifted out of the bearings to reverse the ends of the rockable members to cause the arms 32, 33 to be positioned on the opposite side of the implement and to project in an opposite direction relative to the rockable member 110 than they did prior to the reversing.

A rocker arm 120 is fixed as by welding to the rockable member 110 and projects upwardly therefrom. A rocker arm extension 121 is fixed to the rocker arm 120 by means of bolts 122 which extend through fore-and-aft extending apertures in the rocker arm 120 and which are threadedly received in complementary tapped bores provided in the extension 121. Provided at the end of the extension 121 is a bore 123 which receives the pin 92. The purpose of providing a mounting of this type for attaching the extension 121 to the rocker arm 120 is to permit the extension to always project forwardly of the rocker arm 120 regardless of whether the wheel arms 32 and 33 are projecting rearwardly of the rockable member 110, as shown in Fig. 10, or are projecting forwardly of the rockable member 110, as shown in Fig. 11. Thus, as the rockable member 110 is reversed, the extension 121 may also be reversed relative to the rocker arm 120. With the exception of the modification of the rocker arm, the force transmitting means or hydraulic means for raising or lowering the implement operates in a manner similar to that previously described. Therefore, detail of the linkage and hydraulic unit will not be repeated.

While only one modification of the invention has been shown, it should be recognized that other forms and variations could exist without departing basically from the broad general principles herein disclosed. It should therefore be understood that while the preferred embodiments of the invention have been described with the view of clearly and concisely illustrating the invention, it is desired not to limit or narrow the invention beyond that which is claimed.

What is claimed is:

1. A wheel assembly for a farm implement movable over a field of earth-borne plants and operative to treat the plants in a swath of predetermined width, comprising: a rockable member mounted on the implement for movement about a transverse axis; transversely spaced wheel means connected to and operative upon movement of the member to raise or lower the implement; said wheel means being adjustable transversely to be positionable inwardly of or outwardly of the swath and adjustable fore-and-aft thereby being positionable forwardly or rearwardly of the rockable member; a hydraulic cylinder supported on the implement including an axially reciprocating ram; linkage means connecting the ram to the rockable member including an adjustment therein whereby a force exerted by the ram in its extension stroke will raise the implement regardless of whether the wheel means are positioned rearwardly of or forwardly of the rockable member.

2. A wheel assembly for a farm implement movable over a field of earth-borne plants, comprising: a rockable member mounted on the implement for movement about a transverse axis; wheel means connected to and operative upon movement of the member to raise or lower the implement; said wheel means being adjustable fore-and-aft to be positionable forwardly or rearwardly of the rockable member; a hydraulic cylinder supported on the implement including an axially reciprocating ram; linkage means connecting the ram to the rockable member including an adjustment therein whereby a force exerted by the ram in its extension stroke will raise the implement regardless of whether the wheel means are positioned rearwardly of or forwardly of the rockable member.

3. A wheel assembly for a farm implement movable over a field of earth-borne plants and operative to treat the plants in a swath of predetermined width, the implement including a wide portion and a relatively narrow portion, the narrow portion being substantially narrower than the width of the swath and spaced fore-and-aft from the wide portion, comprising: a rockable member mounted on the implement for movement about a transverse axis; transversely spaced wheel means connected to and operative upon movement of the member to raise or lower the implement; means for adjusting said wheel means transversely and fore-and-aft thereby permitting the wheel means to be positionable adjacent to the wide or narrow portions and inwardly or outwardly of the swath; a hydraulic unit including an axially reciprocating ram; means connecting the ram to the rockable member including an adjustment therein whereby a force exerted by the ram in its extension stroke will raise the implement regardless of whether the wheel means are positioned rearwardly of or forwardly of the rockable member.

4. An implement of the type described having front and rear ends and adapted to be drawn over a field of earth-borne plants by a draft vehicle having implement connecting means and operative to treat the plants; a transverse rockshaft mounted on the rear of the implement; arm means extending from opposite ends of the rockshaft, each of the arm means including a first portion disposed in telescoping relationship with the rockshaft and a second portion fixed to the first portion and extending radially relative to the axis of the rockshaft; means connecting the arm means to the rockshaft permitting axial adjustment relative to the rockshaft and adjustable to cause the second portion to extend rearwardly or forwardly of the rockshaft; wheel means mounted on each of the respective arm means operative in response to rocking motion of the rockshaft to raise or lower the rear of the implement; a rocker arm fixed to the rockshaft; a lever having one of its end portions pivotally connected to the rocker arm; force transmitting means connected to the other of the end portions and operative to cause the latter to move fore-and-aft; means on the implement selectively adaptable to engage a mid-portion of the lever to cause the lever to rock about its mid-portion upon operation of the force transmitting means thereby causing fore-and-aft movement of the rocker arm; means extending between the lever and the rocker arm selectively operative to lock the arm and lever against relative movement thereby causing fore-and-aft movement of the rocker arm when the mid-portion of the lever is not engaged and upon operation of the force transmitting means, and to lock the rocker arm against movement when the mid-portion of the lever is engaged; and a hitch device including a fore-and-aft extending rigid framework pivotally connected at its rear to the front end of the implement and including a rigid vertical section, means on the forward end of the framework adaptable for connection to the implement connecting means, and means extending between the vertical section and the implement for adjusting the height of the front end of the implement.

5. An implement of the type described having front and rear ends and adapted to be drawn over a field of earth-borne plants by a draft vehicle having implement connecting means and operative to treat the plants in a swath of predetermined width parallel to the direction of travel; a transverse rockshaft mounted on the rear of the implement; arm means extending from opposite ends of the rockshaft; wheel means mounted on each of the respective arm means; means fixedly connecting the arm means to the rockshaft including axial and radial adjustments therein for positioning the wheel means forwardly of the rockshaft and laterally outwardly of the implement or to the rear of the implement and inwardly or outwardly of the swath; force transmitting means mounted on the implement operative to rock the rockshaft thereby raising or lowering the rear end of the implement; and a hitch device including a fore-and-aft extending rigid framework pivotally connected at its rear to the front end of the implement and including a rigid vertical section; means on the forward end of the framework adaptable for connection to the implement connecting means; and means extending between the vertical section and the implement for adjusting the height of the front end of the implement.

6. A wheel assembly for a farm implement movable over a field of earth-borne plants comprising: transversely spaced and longitudinally extending wheel-supporting arms; wheel means mounted on the arms; mounting means for supporting the arms on the implement including therein a rockable member movable about a transverse axis and operative upon movement to adjust the arms vertically for raising or lowering the implement, the mounting means being adjustable to position the arms to extend forwardly or rearwardly of the rockable member; a hydraulic unit including an axially reciprocating ram; linkage means connecting the ram to the rockable member including an adjustment therein whereby a force exerted by the ram in a given direction may have the same ultimate effect of raising or lowering the implement regardless of whether the arms are positioned rearwardly of or forwardly of the rockable member.

7. The invention defined in claim 6, in which the rockable member is a transverse rockshaft and the mounting means further includes means rockably fixing the rockshaft to the implement, a pair of transverse members mounted in telescoping relationship with the rockshaft and having means thereon for fixing the arms thereto; and means extending between the rockshaft and the transverse members for preventing relative movement therebetween.

8. The invention defined in claim 7. in which the means for preventing relative movement between the rockshaft and the transverse members are pins which may be extended through the rockshaft and member and which may operate to fix the rockshaft and member at one of a plurality of relative angular positions.

9. The invention defined in claim 6, in which the rockable member is a transverse rockshaft and the mounting means further includes means for fixing the arms to rockshaft and journal means mounted on the implement for supporting the rockshaft, said journal means being adaptable to permit removal and reversal of the rockshaft relative to the implement to cause the arms to project oppositely relative to the transverse axis than they did prior to reversal.

10. The invention defined in claim 9 in which the means connecting the force transmitting means to the rockshaft includes a fore-and-aft extending rocker arm and connecting means fixedly but detachably securing the rocker arm to the rockshaft, said connecting means being adaptable to reverse the direction of the rocker arm upon reversal of the rockshaft.

11. A wheel assembly for an implement operative to move over the ground and to treat earth borne materials in a swath of predetermined width and parallel to the direction of travel and having a portion thereof substantially narrower than the width of the swath, said wheel assembly comprising: a rockable member mounted on the implement for movement about a transverse axis; ground engaging wheels operative upon rocking of the member to raise or lower the implement; means connecting the wheels to the rockable member including therein means for adjusting the wheels axially and fore-and-aft to selectively position the wheels adjacent to the narrow portion and inwardly or outwardly of the swath; force transmitting means mounted on the implement and connected to the rockable member for rocking the latter.

12. The invention defined in claim 11, in which each of the means connecting a wheel to the rockable member comprises a longitudinally extending arm having one end adapted for mounting on the rockable member for movement in unison therewith; a transverse wheel axle on the other end of the arm; and means on the arm for causing said axle to extend inwardly or outwardly of the arm to position the wheel on the axle inwardly or outwardly of the arm.

13. The invention defined in claim 11, in which the rockable member is a transverse rockshaft and each of the means connecting a wheel to the rockshaft comprises a transverse shaft operative to move axially in telescoping relationship with the rockshaft, a longitudinally extending arm fixed to the transverse shaft, wheel supporting axle means on the arm for mounting the wheel on the arm; and lock means between the shaft and rockshaft for fixing said shaft and rockshaft at a plurality of relative axial positions.

14. A wheel assembly for an implement operative to move over the ground and to treat earth borne materials in a swath of predetermined width and parallel to the direction of travel, said wheel assembly comprising: a rockable member mounted on the implement for movement about a transverse axis; transversely spaced wheel supporting arms; means connecting the arms to the rockable member including therein means for adjusting the arms axially inwardly or outwardly of the swath and for positioning the arms to extend forwardly or rearwardly of the member; implement supporting ground wheels mounted respectively on said arms and operative to raise or lower the implement upon rocking of the rockable member; a lever having an end portion pivotally connected to the member radially from its axis; force transmitting means mounted on the implement and connected to an opposite end portion of the lever to move the latter fore-and-aft; a lever support mounted on the implement and selectively engageable with a mid-portion of the lever to cause the latter to rock fore-and-aft about its mid-portion upon operation of the force transmitting means; and means for fixing the link against pivotal movement relative to the rockable member thereby causing the lever to rock about the aforesaid transverse axis in response to the force transmitting means when the support is not engaged with the mid-portion, and for preventing raising or lowering of the implement when the support is engaged with the mid-portion.

15. The invention set forth in claim 1, further characterized by said rockable member having an arm-receiving part fixed to each end thereof, and said wheel means includes a pair of wheel arms, a wheel mounted on each arm at one side thereof, and means fixing each wheel arm to the associated arm-receiving part so as to dispose the associated wheel optionally at the outer side or the inner side of the associated arm, thereby disposing said wheels inwardly or outwardly relative to the swath over which the implement passes.

16. The invention set forth in claim 2, further characterized by said rockable member having an arm-receiving part fixed to each end thereof, and said wheel means includes a pair of wheel arms, a wheel mounted on each arm at one side thereof, and means fixing each wheel arm to the associated arm-receiving part so as to dispose the associated wheel optionally at the outer side or the inner side of the associated arm.

17. The invention set forth in claim 2, further characterized by said linkage means comprising a rocker arm fixed to said rockable member, a lever having one portion pivotally connected to the rocker arm, force transmitting means connecting said ram with another portion of said lever and operative to cause the lever to move fore-and-aft, means on the implement selectively adaptable to engage a mid-portion of the lever to cause the lever to rock about its mid-portion upon operation of said ram, thereby causing fore-and-aft movement of the rocker arm, and means extending between the lever and the rocker arm selectively operative to lock the arm and lever against relative movement, thereby, causing fore-and-aft movement of the rocker arm when the mid-portion of the lever is not engaged and upon operation of the ram and to lock the rocker arm against movement when the mid-portion of the lever is engaged.

References Cited in the file of this patent
UNITED STATES PATENTS

| | | |
|---|---|---|
| 2,351,830 | Mitchell | June 20, 1944 |
| 2,704,021 | Brundage | Mar. 15, 1955 |